C. BENTZ.
Whiffletree.
No. { 1,674, 32,678. }
Patented July 2, 1861.
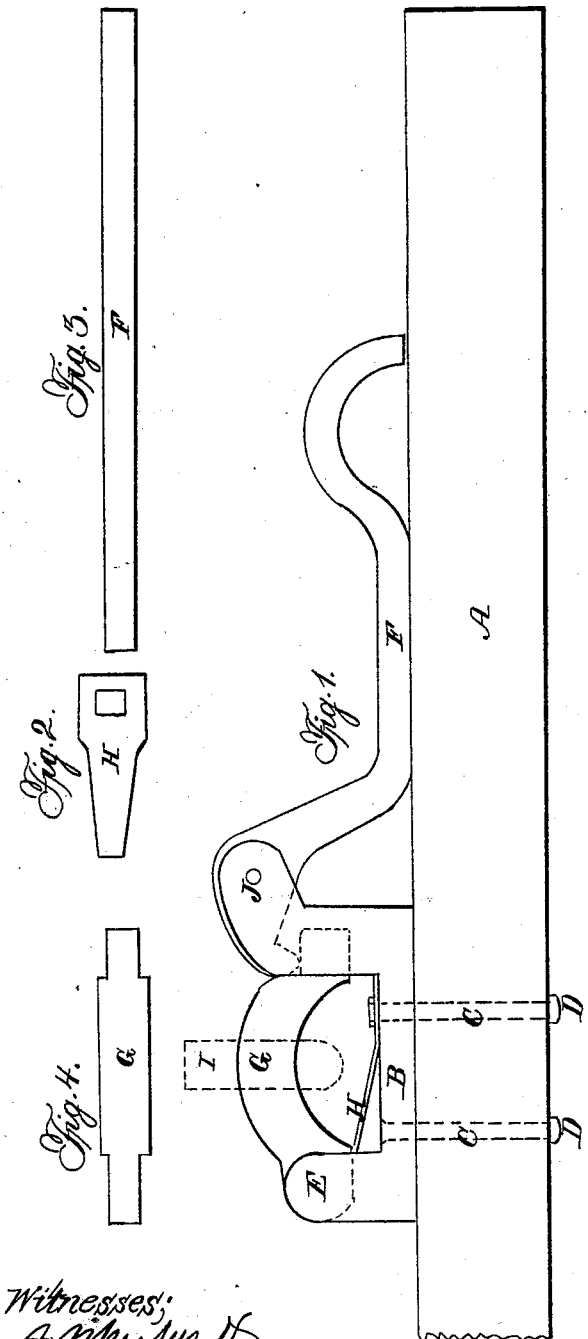
Witnesses:
G. G. Whiting
D. S. Collins
Inventor:
Charles Bentz

UNITED STATES PATENT OFFICE.

CHARLES BENTZ, OF MINDENVILLE, NEW YORK.

WHIFFLETREE-HOOK.

Specification of Letters Patent No. 32,678, dated July 2, 1861.

*To all whom it may concern:*

Be it known that I, CHARLES BENTZ, of Mindenville, town of Minden, county of Montgomery, and State of New York, have invented a new and useful Improvement in Whiffletree-Hooks for Detaching Tow-Lines from Tow-Horses on Canals; and I hereby declare the following to be a full and exact description.

To enable others to make and use my invention, I proceed to describe its construction and operation, reference being had to the drawings hereunto annexed, and making part of this specification.

Figure 1, side elevation of whiffletree hook. Fig. 2, plan of the spring. Fig. 3, lever. Fig. 4, cock-eye.

F is a lever.
G is a cock eye.
I is a tow line.
J is the ear for attaching the lever F.
E is the ear for attaching the cock eye G.
C C are bolts passing through a section or part of the whiffletree A.
D D are nuts screwed to the bolts C C.
B, is the bed piece of the machine, which comes in contact with the whiffletree A and is attached firmly to it by means of the bolts C C and the nuts D D.
H is a spring for holding the cock eye G and lever F when properly adjusted to their places, and when the tow line I is fastened to the cock eye G.
A, represents a section or part of a whiffletree, which is to be attached to the traces of a saddle horse, and the machine which is to be attached thereto, is to be connected with the tow line I, for the purposes of propelling canal boats.

The construction of my machine for attaching and detaching tow lines from tow horses of canal boats, is so simple in its arrangements, that any ordinary mechanic could make it, and it is not liable to get out of order, and it can be made of wrought or malleable cast iron.

The spring H in connection with the lever F and cock eye G are the important features of my invention. This spring H is so fastened to the main part or bed piece of the machine B underneath the cock eye G, that when the tow line I is attached to the cock eye G and the lever F is raised sufficiently to allow the cock eye G to be forced past it, down upon the spring H, then the lever F is forced down upon the whiffletree A, and thus the machine is in effective operation for the draft of horses.

In detaching the tow line I the hand is placed upon the lever F in order to force it from the whiffletree A, which loosens the cock eye G and consequently the tow line I.

I do not choose to limit myself to the kind of spring H which I use, nor to the form of the lever F or the cock eye G, but claim the use of any kind that will be equivalent thereto or answer substantially the same purposes.

The advantages to be gained by my invention, are that it prevents horses from being drowned, as they can be instantly detached from the tow line I in swells or currents of water which are very common upon canals, and which force the boats back, and consequently the horses backward into the water.

In the manufacture of my machine, it is either to be forged out of wrought iron or made in the usual manner of making malleable cast iron.

What I claim as my invention, and desire to secure by Letters Patent is—

The arrangement of the spring H, cock eye G, lever F and bed piece B when they are attached to the whiffletree A and made to operate in the manner and for the purposes within described.

CHARLES BENTZ.

Signed in the presence of—
G. J. WHEELER,
D. S. COLLINS.